(12) United States Patent
Han

(10) Patent No.: US 8,428,658 B2
(45) Date of Patent: Apr. 23, 2013

(54) METHOD FOR DISPLAYING ITEMS IN MOBILE TERMINAL AND MOBILE TERMINAL USING THE SAME

(75) Inventor: Seung Sook Han, Seoul (KR)

(73) Assignee: LG Electronics Inc., Seoul (KR)

( * ) Notice: Subject to any disclaimer, the term of this patent is extended or adjusted under 35 U.S.C. 154(b) by 576 days.

(21) Appl. No.: 12/713,152

(22) Filed: Feb. 25, 2010

(65) Prior Publication Data
US 2010/0222112 A1 Sep. 2, 2010

(30) Foreign Application Priority Data

Mar. 2, 2009 (KR) ........................ 10-2009-0017471

(51) Int. Cl.
*G06F 3/01* (2006.01)
(52) U.S. Cl.
USPC ....... 455/566; 455/557; 455/90.3; 455/158.4; 345/173; 715/702; 715/810
(58) Field of Classification Search .................. 455/566, 455/418, 419, 457, 3.06, 412.1, 414.1, 414.4, 455/425, 41.1, 556.1, 557, 158.4, 186.1, 455/183.2, 254, 90.3; 715/863, 862, 825, 715/810, 702, 841, 850, 811, 821, 838, 864, 715/808, 764, 739, 853; 345/629, 440, 581, 345/659, 173, 156, 531, 681
See application file for complete search history.

(56) References Cited

U.S. PATENT DOCUMENTS

| | | | | |
|---|---|---|---|---|
| 7,246,320 B2 * | 7/2007 | Foucher et al. | ............... | 715/739 |
| 7,653,883 B2 * | 1/2010 | Hotelling et al. | ............. | 715/863 |
| 7,995,061 B2 * | 8/2011 | Kim et al. | ...................... | 345/440 |
| 8,122,083 B2 * | 2/2012 | Hanada et al. | ................. | 709/203 |
| 2002/0128030 A1 * | 9/2002 | Eiden et al. | ................... | 455/519 |
| 2003/0014330 A1 * | 1/2003 | Showghi et al. | ................ | 705/26 |
| 2005/0280660 A1 * | 12/2005 | Seo et al. | ....................... | 345/629 |
| 2006/0161871 A1 * | 7/2006 | Hotelling et al. | ............. | 715/863 |
| 2006/0184896 A1 * | 8/2006 | Foucher et al. | ............... | 715/810 |
| 2007/0171192 A1 * | 7/2007 | Seo et al. | ....................... | 345/156 |
| 2008/0218534 A1 * | 9/2008 | Kim et al. | ...................... | 345/681 |
| 2009/0064039 A1 * | 3/2009 | Lee et al. | ....................... | 715/810 |
| 2009/0289914 A1 * | 11/2009 | Cho | ............................... | 345/173 |
| 2010/0251178 A1 * | 9/2010 | Lee et al. | ....................... | 715/825 |

* cited by examiner

*Primary Examiner* — Tan Trinh
(74) *Attorney, Agent, or Firm* — Birch, Stewart, Kolasch & Birch, LLP

(57) ABSTRACT

A method for displaying items in mobile terminal and a mobile terminal using the same, the method comprising: storing a plurality of items in a memory of the mobile terminal; receiving a grouping command by a proximity touch on the plurality of items through a proximity sensor of the mobile terminal; and generating and displaying a classification menu including classified items with classifying the plurality of items by the grouping command and storing the classified items in the classification menu.

19 Claims, 7 Drawing Sheets

METHOD FOR DISPLAYING ITEMS IN MOBILE TERMINAL AND MOBILE TERMINAL USING THE SAME

Pursuant to 35 U.S.C. §119 (a), this application claims the benefit of earlier filing date and right of priority to Korean Patent Application No. 10-2009-0017471, filed on Mar. 2, 2009, the contents of which are hereby incorporated by reference in their entirety.

BACKGROUND OF THE DISCLOSURE

1. Field

The present disclosure relates to a method for displaying items in mobile terminal and a mobile terminal using the same.

2. Background

Generally, terminals can be classified into mobile/portable terminals and stationary terminals. The mobile terminals can be further classified into handheld terminals and vehicle mount terminals according to possibility of user's direct portability.

As functions of the terminal are diversified, the terminal is implemented as a multimedia player provided with composite functions such as photographing of photos or moving pictures, playback of music or moving picture files, game play, broadcast reception and the like, for example.

To implement the complex functions in the multimedia player, improvement of structural parts and/or software parts of the terminal may be considered in various attempts. The recent mobile terminals as multimedia have been improved to have various functions, in addition to the intrinsic communicating functions.

That is, concomitant with development of technologies, the mobile terminals come to be equipped with more functions such as capacity to store more menus and files.

SUMMARY

In one general aspect of the present disclosure, a method for displaying items in mobile terminal, the method comprising: storing a plurality of items in a memory of the mobile terminal; receiving a grouping command by a proximity touch on the plurality of items through a proximity sensor of the mobile terminal; and generating and displaying a classification menu including classified items with classifying the plurality of items by the grouping command and storing the classified items in the classification menu.

In some exemplary embodiments, the method may further comprise displaying classified items belonging to selected classification menu in a case a selection signal to the classification menu is generated.

In some exemplary embodiments, the step of displaying classified items belonging to selected classification menu in a case a selection signal to the classification menu is generated may comprise displaying the classified items belonging to the selected classification menu as a micro proximity signal to the classification menu is implemented.

In some exemplary embodiments, the method may further comprise executing touched classified items in a case a touch signal to the displayed classified items is generated.

In some exemplary embodiments, the step of displaying classified items belonging to selected classification menu in a case a selection signal to the classification menu is generated may comprise displaying the classified items belonging to the selected classification menu in a case a touch signal to the classification menu is generated.

In some exemplary embodiments, the plurality of items may be call history items, and the grouping command may be an initial classification command of a caller. In some exemplary embodiments, the plurality of items may be multimedia files, and the grouping command may be a grouping command in response to tag information of the multimedia files.

In some exemplary embodiments, the plurality of items may be text message items, and the grouping command may be a date-based classification command.

In some exemplary embodiments, the step of receiving a grouping command by a proximity touch on the plurality of items through a proximity sensor of the mobile terminal may comprise: measuring a distance of a pointing device from a display displayed with the plurality of items; and generating the grouping command in a case the measured distance is shorter than a predetermined distance.

In another general aspect of the present disclosure, a mobile terminal using a method for displaying items in the mobile terminal may comprise: a memory configured to store a plurality of items; a display configured to display the plurality of items; a proximity sensor configured to generate a grouping command in response to a proximity touch signal; and a controller configured to controllably classify the plurality of items, and to generate a classification menu including classified items in response to the proximity signal from the proximity sensor, and to display the classification menu on the display.

In some exemplary embodiments, the controller may display on the display the classified items belonging to selected classification menu, in a case a selection signal is generated by the classification menu.

In some exemplary embodiments, the controller may display on the display the classified items belonging to the selected classification menu, in a case a micro proximity signal is generated by the proximity sensor through the proximity sensor.

In some exemplary embodiments, the display may be a touch screen, and the controller may control the touched classified items to be executed, in a case a touch signal on the classified items displayed on the touch screen is generated.

In some exemplary embodiments, the display may be a touch screen, and the controller may control the touched classified items belonging to the selected classification menu to be displayed on the touch screen, in a case a touch signal on the classification menu is generated.

In some exemplary embodiments, the plurality of items may be call history items, and the grouping command may be an initial classification command of a caller.

In some exemplary embodiments, the plurality of items may be multimedia files, and the grouping command may be a grouping command in response to tag information of the multimedia files.

In some exemplary embodiments, the plurality of items may be text message items, and the grouping command may be a date-based classification command.

In some exemplary embodiments, the proximity sensor may generate a proximity signal, in a case a distance between the proximity sensor and a pointing device is shorter than a predetermined proximity distance.

In some exemplary embodiments, the proximity sensor may generate a micro proximity signal, in a case a distance between the proximity sensor and a pointing device is shorter than a predetermined micro proximity distance.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

The suffixes 'module', 'unit' and 'part' may be used for elements in order to facilitate the disclosure. Significant meanings or roles may not be given to the suffixes themselves and it is understood that the 'module', 'unit' and 'part' may be used together or interchangeably.

Embodiments of the present disclosure may be applicable to various types of terminals. Examples of such terminals may include mobile terminals as well as stationary terminals, such as mobile phones, user equipment, smart phones, DTV, computers, digital broadcast terminals, personal digital assistants, portable multimedia players (PMP) and/or navigators.

A further description may be provided with regard to a mobile terminal, although such teachings may apply equally to other types of terminals such as stationary terminals that include digital TVs and desktop computers, the details of which are well known to the persons in the art.

Figure 1:
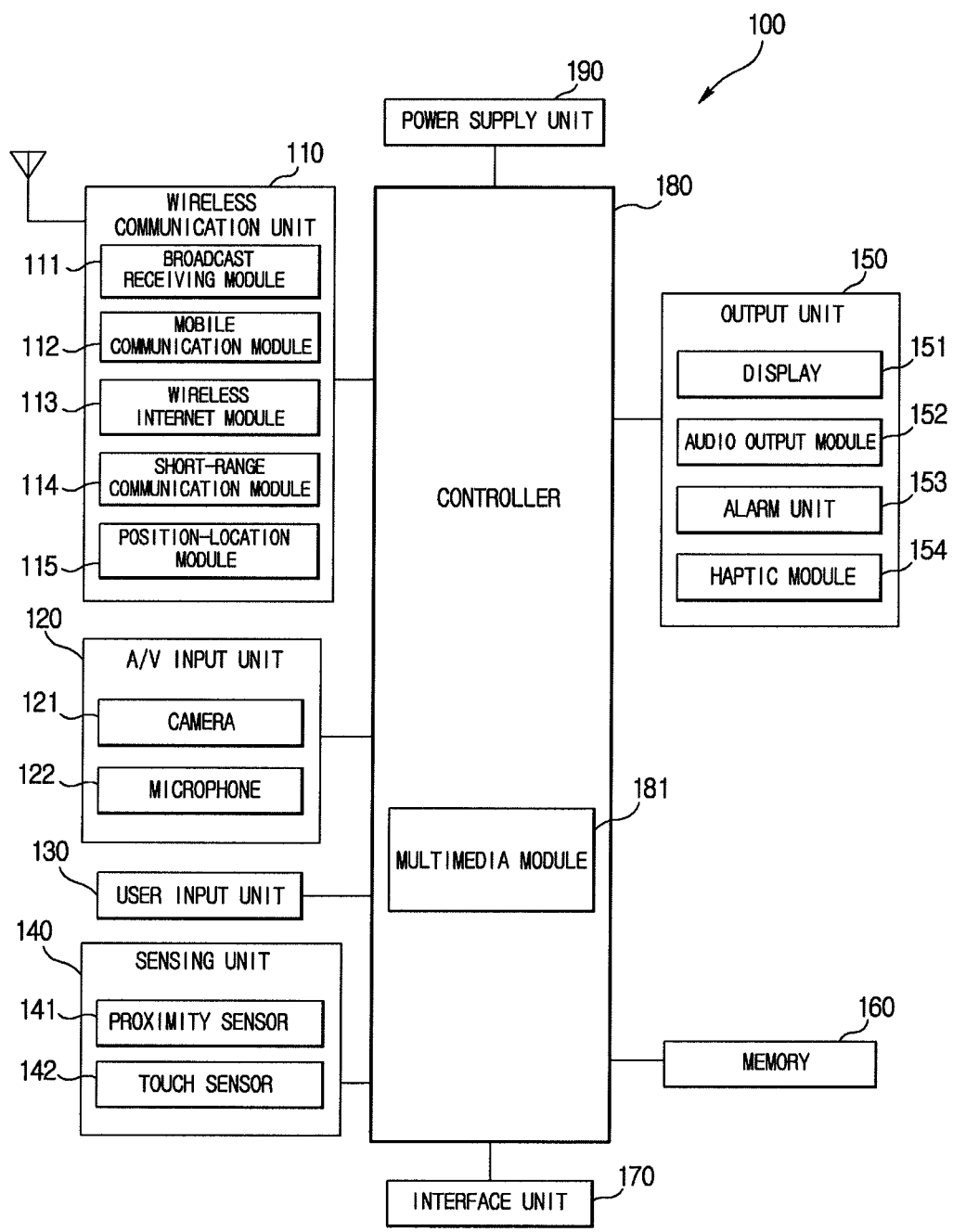
FIG. 1 is a block diagram of a mobile terminal according to an exemplary embodiment of the present disclosure.

FIG. 1 is a block diagram of a mobile terminal in accordance with an example embodiment. Other embodiments and arrangements may also be provided. FIG. 1 shows a mobile terminal 100 having various components, although other components may also be used. More or less components may alternatively be implemented.

FIG. 1 shows that the mobile terminal 100 includes a wireless communication unit 110, an audio/video (AN) input unit 120, a user input unit 130, a sensing unit 140, an output unit 150, a memory 160, an interface unit 170, a controller 180 and a power supply 190.

The wireless communication unit 110 may be configured with several components and/or modules. The wireless communication unit 110 may include a broadcast receiving module 111, a mobile communication module 112, a wireless Internet module 113, a short-range communication module 114 and a position-location module 115. The wireless communication unit 110 may include one or more components that permit wireless communication between the mobile terminal 100 and a wireless communication system or a network within which the mobile terminal 100 is located. In case of non-mobile terminals, the wireless communication unit 110 may be replaced with a wire communication unit. The wireless communication unit 110 and the wire communication unit may be commonly referred to as a communication unit.

The broadcast receiving module 111 may receive a broadcast signal and/or broadcast associated information from an external broadcast managing entity via a broadcast channel. The broadcast channel may include a satellite channel and a terrestrial channel. The broadcast managing entity may refer to a system that transmits a broadcast signal and/or broadcast associated information.

At least two broadcast receiving modules 111 may be provided in the mobile terminal 100 to pursue simultaneous reception of at least two broadcast channels or facilitation of broadcast channel switching.

Examples of broadcast associated information may include information associated with a broadcast channel, a broadcast program, a broadcast service provider, etc. For example, broadcast associated information may include an electronic program guide (EPG) of digital multimedia broadcasting (DMB) and an electronic service guide (ESG) of digital video broadcast-handheld (DVB-H).

The broadcast signal may be a TV broadcast signal, a radio broadcast signal, and/or a data broadcast signal. The broadcast signal may further include a broadcast signal combined with a TV or radio broadcast signal.

The broadcast receiving module 111 may receive broadcast signals transmitted from various types of broadcast systems. As a non-limiting example, the broadcasting systems may include digital multimedia broadcasting-terrestrial (DMB-T), digital multimedia broadcasting-satellite (DMB-S), digital video broadcast-handheld (DVB-H), a data broadcasting system known as media forward link only (Media-FLO®) and integrated services digital broadcast-terrestrial (ISDB-T). The receiving of multicast signals may also be provided. Data received by the broadcast receiving module 111 may be stored in the memory 160, for example.

The mobile communication module 112 may communicate wireless signals with one or more network entities (e.g. a base station or Node-B). The signals may represent audio, video, multimedia, control signaling, and data, etc.

The wireless Internet module 113 may support Internet access for the mobile terminal 100. This wireless Internet module 113 may be internally or externally coupled to the mobile terminal 100. Suitable technologies for wireless Internet may include, but are not limited to, WLAN (Wireless LAN)(Wi-Fi), Wibro (Wireless broadband), Wimax (World Interoperability for Microwave Access), and/or HSDPA (High Speed Downlink Packet Access). The wireless Internet module 113 may be replaced with a wire Internet module in non-mobile terminals. The wireless Internet module 113 and the wire Internet module may be referred to as an Internet module.

The short-range communication module 114 may facilitate short-range communications. Suitable technologies for short-range communication may include, but are not limited to, radio frequency identification (RFID), infrared data association (IrDA), ultra-wideband (UWB), as well as networking technologies such as Bluetooth and ZigBee.

The position-location module 115 may identify or otherwise obtain a location of the mobile terminal 100. The position-location module 115 may be provided using global positioning system (GPS) components that cooperate with associated satellites, network components, and/or combinations thereof.

The position-location module 115 may precisely calculate current 3-dimensional position information based on longitude, latitude and altitude by calculating distance information and precise time information from at least three satellites and then by applying triangulation to the calculated information. Location and time information may be calculated using three satellites, and errors of the calculated location position and time information may then be amended or changed using another satellite. The position-location module 115 may calculate speed information by continuously calculating a real-time current location. The audio/video (A/V) input unit 120 may provide audio or video signal input to the mobile terminal 100. The A/V input unit 120 may include a camera 121 and a microphone 122. The camera 121 may receive and process image frames of still pictures and/or video.

The microphone 122 may receive an external audio signal while the mobile terminal is in a particular mode, such as a phone call mode, a recording mode and/or a voice recognition mode. The received audio signal may then be processed and converted into digital data.

The mobile terminal 100, and in particular the A/V input unit 120, may include a noise removing algorithm (or noise canceling algorithm) to remove noise generated in the course of receiving the external audio signal. Data generated by the A/V input unit 120 may be stored in the memory 160, utilized by the output unit 150, and/or transmitted via one or more modules of the wireless communication unit 110. Two or more microphones and/or cameras may also be provided.

The user input unit 130 may generate input data responsive to user manipulation of an associated input device or devices. Examples of such devices may include a keypad, a dome switch, a touchpad (e.g., static pressure/capacitance), a jog wheel and/or a jog switch. A specific example is one in which the user input unit 130 is configured as a touchpad in cooperation with a display, as will be described below.

The sensing unit 140 may provide status measurements of various aspects of the mobile terminal 100. For example, the sensing unit 140 may detect an open/close status (or state) of the mobile terminal 100, a relative positioning of components (e.g., a display and a keypad) of the mobile terminal 100, a change of position of the mobile terminal 100 or a component of the mobile terminal 100, a presence or absence of user contact with the mobile terminal 100, and/or an orientation or acceleration/deceleration of the mobile terminal 100.

The mobile terminal 100 may be configured as a slide-type mobile terminal. In such a configuration, the sensing unit 140 may sense whether a sliding portion of the mobile terminal 100 is open or closed. The sensing unit 140 may also sense presence or absence of power provided by the power supply 190, presence or absence of a coupling or other connection between the interface unit 170 and an external device, etc.

The sensing unit 140 may include a proximity sensor 141.

The output unit 150 may generate an output relevant to a sight sense, an auditory sense, a tactile sense and/or the like. The output unit 150 may include a display 151, an audio output module 152, an alarm 153, a haptic module 154 and/or the like.

The display 151 may display (output) information processed by the terminal 100. For example, in case that the terminal is in a call mode, the display 151 may display a user interface (UI) or a graphic user interface (GUI) associated with the call. If the mobile terminal 100 is in a video communication mode or a photograph mode, the display 151 may display a photographed and/or received picture, a UI or a GUI.

The display 151 may include at least one of a liquid crystal display (LCD), a thin film transistor liquid crystal display (TFT LCD), an organic light-emitting diode (OLED), a flexible display, and a 3-dimensional display.

The display 151 may have a transparent or light-transmissive type configuration to enable an external environment to be seen through. This may be called a transparent display. A transparent OLED (TOLED) may be an example of a transparent display. A backside structure of the display 151 may also have the light-transmissive type configuration. In this configuration, a user may see an object located behind the terminal body through the area occupied by the display 151 of the terminal body.

At least two or more displays 151 may also be provided. For example, a plurality of displays may be provided on a single face of the terminal 100 by being built in one body or spaced apart from the single face. Alternatively, each of a plurality of displays may be provided on different faces of the terminal 100.

If the display 151 and a sensor for detecting a touch action (hereinafter a touch sensor) are constructed in a mutual-layered structure (hereinafter a touch screen), the display 151 may be used as an input device as well as an output device. For example, the touch sensor 142 may include a touch film, a touch sheet, a touchpad and/or the like.

The touch sensor 142 may convert a pressure applied to a specific portion of the display 151 or a variation of electrostatic capacity generated from a specific portion of the display 151 to an electric input signal. The touch sensor may detect a pressure of a touch as well as a position and size of the touch.

If a touch input is provided to the touch sensor 142, signal (s) corresponding to the touch input may be transferred to a touch controller. The touch controller may process the signal (s) and then transfer corresponding data to the controller 180. The controller 180 may therefore know which portion of the display 151 is touched.

The audio output module 152 may output audio data that is received from the wireless communication unit 110 in a call signal reception mode, a call mode, a recording mode, a voice recognition mode, a broadcast receiving mode and/or the like. The audio output module 152 may output audio data stored in the memory 160. The audio output module 152 may output an audio signal relevant to a function (e.g., a call signal receiving sound, a message receiving sound, etc.) performed by the mobile terminal 100. The audio output module 152 may include a receiver, a speaker, a buzzer and/or the like.

The alarm 153 may output a signal for announcing an event occurrence of the mobile terminal 100. An event occurring in the mobile terminal 100 may include one of a call signal reception, a message reception, a key signal input, a touch input and/or the like. The alarm 153 may output a signal for announcing an event occurrence by way of vibration or the like as well as a video signal or an audio signal. The video signal may be outputted via the display 151. The audio signal may be outputted via the audio output module 152. The display 151 or the audio output module 152 may be classified as part of the alarm 153.

The haptic module 154 may bring about various haptic effects that can be sensed by a user. Vibration is a representative example for the haptic effect brought about by the haptic module 154. Strength and pattern of the vibration generated from the haptic module 154 may be controllable.

For example, vibrations differing from each other may be outputted in a manner of being synthesized together or may be sequentially outputted.

The haptic module 154 may generate various haptic effects including a vibration, an effect caused by such a stimulus as a pin array vertically moving against a contact skin surface, a jet power of air via outlet, a suction power of air via inlet, a skim on a skin surface, a contact of an electrode, an electrostatic power and the like, and/or an effect by hot/cold sense reproduction using an endothermic or exothermic device as well as the vibration.

The haptic module 154 may provide the haptic effect via direct contact. The haptic module 154 may enable a user to experience the haptic effect via muscular sense of a finger, an arm and/or the like. Two or more haptic modules 154 may be provided according to a configuration of the mobile terminal 100.

The memory 160 may store a program for operations of the controller 180. The memory 160 may temporarily store input/output data (e.g., phonebook, message, still picture, moving picture, etc.). The memory 160 may store data of vibration and sound in various patterns outputted in case of a touch input to the touch screen.

The memory 160 may include at least one of a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory, a programmable read-only memory, a magnetic memory, a magnetic disk, an optical disk, and/or the like. The mobile terminal 100 may operate in association with a web storage that performs a storage function of the memory 160 in the Internet.

The interface unit 170 may play a role as a passage to external devices connected to the mobile terminal 100. The interface unit 170 may receive data from an external device. The interface unit 170 may be supplied with a power and then the power may be delivered to elements within the mobile terminal 100. The interface unit 170 may enable data to be transferred to an external device from an inside of the mobile terminal 100. The interface unit 170 may include a wire/wireless headset port, an external charger port, a wire/wireless data port, a memory card port, a port for coupling to a device having an identity module, an audio input/output (I/O) port, a video input/output (I/O) port, an earphone port and/or the like.

The identity module may be a chip or card that stores various kinds of information for authenticating use of the mobile terminal 100. The identify module may include a user identity module (UIM), a subscriber identity module (SIM), a universal subscriber identity module (USIM) and/or the like. A device provided with the above identity module (hereafter an identity device) may be manufactured in the form of a smart card. The identity device may be connected to the mobile terminal 100 via the port.

The interface unit 170 may play a role as a passage for supplying a power to the mobile terminal 100 from a cradle that is connected to the mobile terminal 100. The interface unit 170 may play a role as a passage for delivering various command signals, which are inputted from the cradle by a user, to the mobile terminal 100. Various command signals inputted from the cradle or the power may work as a signal for recognizing that the mobile terminal 100 is correctly loaded in the cradle.

The controller 180 may control overall operations of the mobile terminal 100. For example, the controller 180 may perform control and processing relevant to a voice call, a data communication, a video conference and/or the like. The controller 180 may have a multimedia module 181 for multimedia playback. The multimedia module 181 may be implemented within the controller 180 or may be configured separate from the controller 180.

The controller 180 may perform pattern recognizing processing for recognizing a handwriting input performed on the touch screen as a character an/or recognizing a picture drawing input performed on the touch screen as an image.

The power supply 190 may receive an external or internal power and then supply the power required for operations of the respective elements under control of the controller 180.

Embodiments of the present disclosure explained in the following description may be implemented within a recording medium that can be read by a computer or a computer-like device using software, hardware or combination thereof.

According to the hardware implementation, arrangements and embodiments may be implemented using at least one of application specific integrated circuits (ASICs), digital signal processors (DSPs), digital signal processing devices DSPDs), programmable logic devices (PLDs), field programmable gate arrays (FPGAs), processors, controllers, microcontrollers, microprocessors and electrical units for performing other functions. In some cases, embodiments may be implemented by the controller 180.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in memory such as the memory 160, and may be executed by a controller or processor, such as the controller 180.

Figure 2:
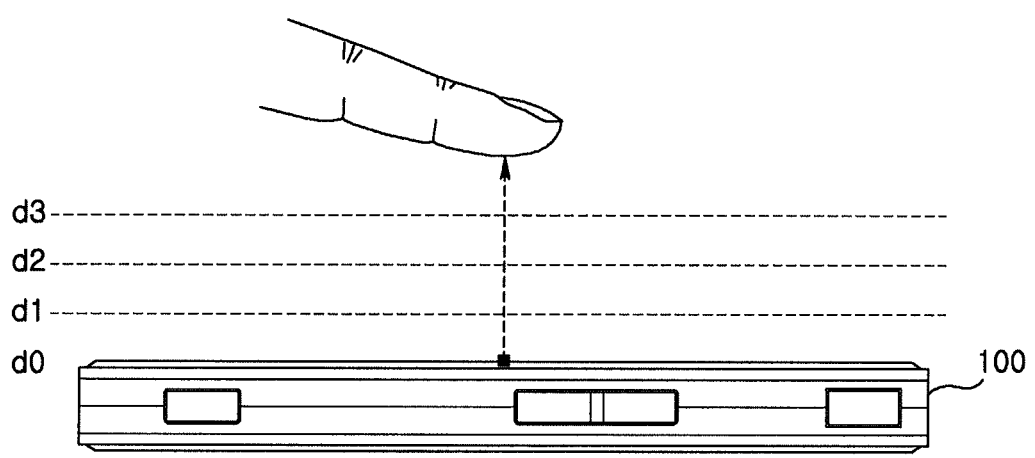
FIG. 2 is a conceptual view illustrating operation of a proximity sensor according to an exemplary embodiment of the present disclosure.

FIG. 2 is a conceptual view illustrating operation of a proximity sensor according to an exemplary embodiment of the present disclosure.

As shown in FIG. 2, a pointer such as a finger of a user or a pen comes near (proximately approaches) the touch screen, the proximity sensor 141 arranged inside or near the touch screen detects the approach of the pointer to output a proximity signal. The proximity sensor 141 may be so configured as to output mutually different proximity signals according to a distance between the proximately approaching pointer and the touch screen (hereinafter referred to as "proximity depth").

Figure 3:
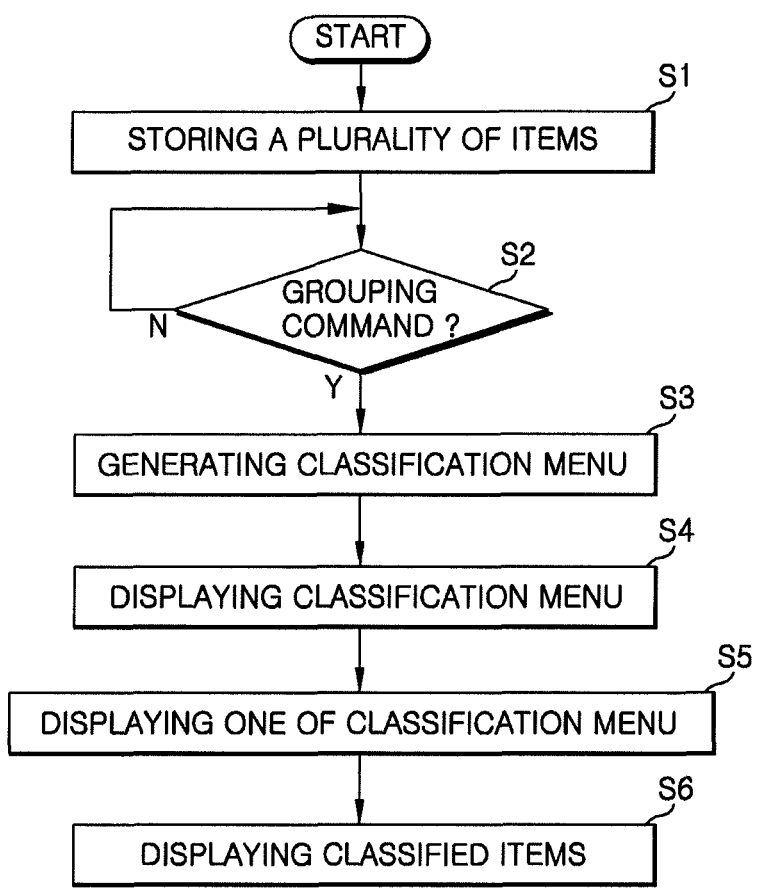
FIG. 3 is a flowchart illustrating a method for displaying items according to an exemplary embodiment of the present disclosure.

FIG. 3 illustrates a touch screen arranged with a proximity sensor capable of detecting, for example, 3 proximity depths. It should be apparent that a proximity sensor capable of detecting fewer than 3 or more than 4 or more proximity depths may be implemented.

To be more specific, a case the pointer completely touches on the touch screen (d0) may be identified as a contact touch. A distance between the pointer and the touch screen less than d1 is identified as a first proximity depth. A distance between the pointer and the touch screen is greater than d1 but less than d2 is identified as a second proximity depth. A distance between the pointer and the touch screen is greater than d2 but less than d3 is identified as a third proximity depth. A distance between the pointer and the touch screen is greater than d3 is identified as the proximity touch having been released.

Therefore, the controller 180 can identify the proximity touch in various input signals according to the proximity depth and proximity position of the pointer, and can execute various operation controls in response to the various input signals.

Now, method for displaying items according to the present disclosure will be described in detail with reference to FIGS. 3 to 7.

Figure 4:
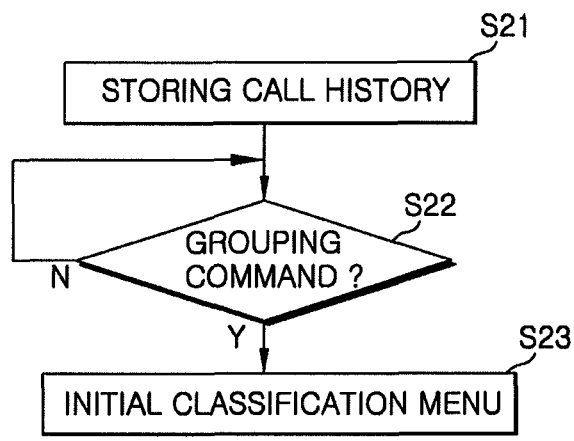
FIG. 4 is a flowchart in which a method for displaying items is applied to a call history according to an exemplary embodiment of the present disclosure.
Figure 5:
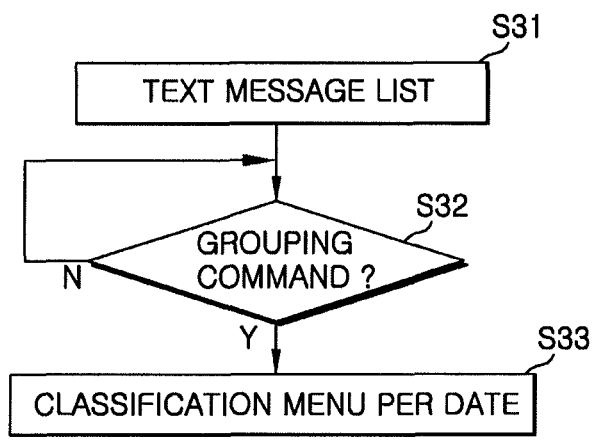
FIG. 5 is a flowchart in which a method for displaying items is applied to a text message list according to an exemplary embodiment of the present disclosure.
Figure 6:
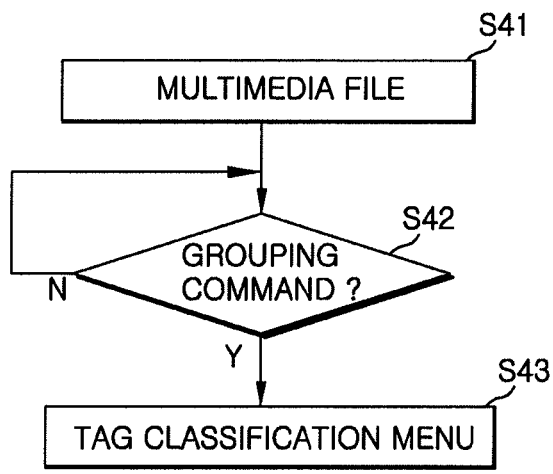
FIG. 6 is a flowchart in which a method for displaying items is applied to a multimedia file according to an exemplary embodiment of the present disclosure.
Figure 7:
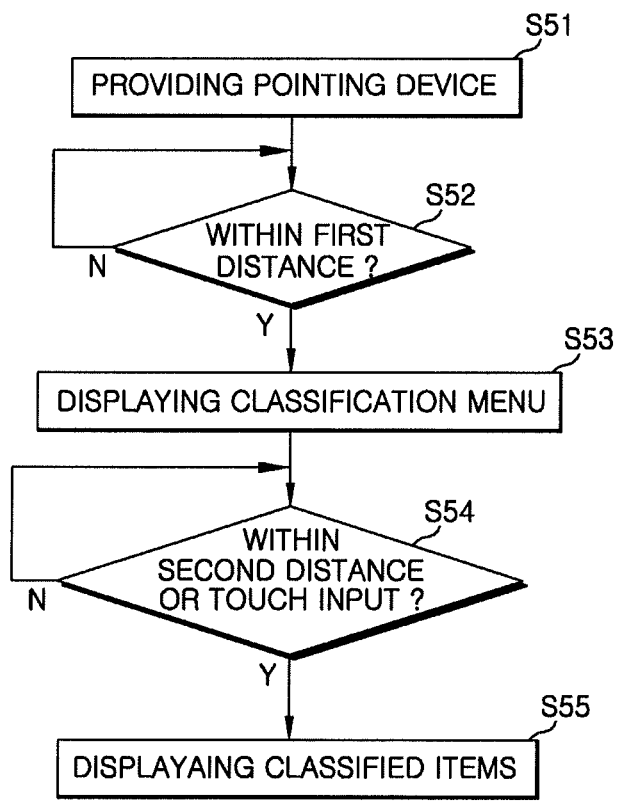
FIG. 7 is a flowchart of a method for displaying items to which a proximity sensor is applied according to an exemplary embodiment of the present disclosure.

FIG. 3 is a flowchart illustrating a method for displaying items according to an exemplary embodiment of the present disclosure, FIG. 4 is a flowchart in which a method for displaying items is applied to a call history according to an exemplary embodiment of the present disclosure, FIG. 5 is a flowchart in which a method for displaying items is applied to a text message list according to an exemplary embodiment of the present disclosure, FIG. 6 is a flowchart in which a method for displaying items is applied to a multimedia file according to an exemplary embodiment of the present disclosure and FIG. 7 is a flowchart of a method for displaying items to which a proximity sensor is applied according to an exemplary embodiment of the present disclosure.

Referring to FIG. 3, the memory 160 of the mobile terminal 100 is stored with a plurality of items (S1). A user may use any one of the proximity sensor 141, the touch sensor 142 and the user input unit 130 to generate a grouping command while the plurality of items is displayed on the display 151 (S2). The controller 180 may generate a classification menu (e.g., a folder represented by an initial) in response to the grouping command, and display the menu on the display 151 (S3, S4). The grouping command may include a long key input, two times of flicking commands or an approach signal from the proximity sensor, details of which will be described in FIGS. 8 to 10.

The classification menu includes classification items classified on classification standard. In a case the user selects one item from the classification menu using the user input unit 130, the proximity sensor 141 and the touch sensor 142, the selected item of the classification menu is displayed on the display 151 (S5, S6).

The proximity sensor 141 may use a micro proximity signal (a signal generated at a closer distance than a proximity signal) in selecting the classification menu. That is, the classification menu may be selected by the micro proximity signal recognized at a distance closer than that of the proximity signal.

In a case the classification menu is selected by the micro proximity signal, items in the classification menu selected by the micro proximity signal may be displayed on the display 151 (touch screen), and in a case a touch signal is generated by one of the displayed items, a selected item is executed. In doing so, an item desired by the user can be conveniently executed by a simple one operation of the user.

FIG. 4 is a flowchart in which a method for displaying items is applied to a call history according to an exemplary embodiment of the present disclosure.

Referring to FIG. 4, the memory 160 of the mobile terminal 100 is stored with a call history (S21). A user may use any one of the proximity sensor 141, the touch sensor 142 and the user input unit 130 to generate a grouping command while the plurality of items is displayed on the display 151 (S22). The grouping command may include a long key input, two times of flicking commands or an approach signal from the proximity sensor, details of which will be described in FIGS. 8 to 10.

The controller 180 may generate an initial classification menu of a caller (or a caller name classification menu) in response to the grouping command, and display the menu on the display 151 (S23). The initial classification menu of a caller is stored with a history starting with the same initials. In a case the user uses any one of the proximity sensor 141, the touch sensor 142 and the user input unit 130 to select an initial out of the initial classification menu, a caller history having the selected initial is displayed on the display 151.

FIG. 5 is a flowchart in which a method for displaying items is applied to a text message list according to an exemplary embodiment of the present disclosure.

Referring to FIG. 5, the memory 160 of the mobile terminal 100 is stored with a text message (S31). A user may use any one of the proximity sensor 141, the touch sensor 142 and the user input unit 130 to generate a grouping command while a plurality of text messages is displayed on the display 151 (S32). The controller 180 may generate a message classification menu (e.g., date or a folder represented by a caller) in response to the grouping command, and display the menu on the display 151 (S33).

In a case the user uses any one of the proximity sensor 141, the touch sensor 142 and the user input unit 130 to select one of items from the message classification menu, the selected message item of the message classification menu is displayed on the display 151.

FIG. 6 is a flowchart in which a method for displaying items is applied to a multimedia file according to an exemplary embodiment of the present disclosure.

Referring to FIG. 6, the memory 160 of the mobile terminal 100 is stored with a plurality of multimedia files (S41). A user may use any one of the proximity sensor 141, the touch sensor 142 and the user input unit 130 to generate a grouping command while a plurality of items is displayed on the display 151 (S42). The controller 180 may generate a tag classification menu (e.g., a folder represented by a name of multimedia file, a composer tag, a singer tag) in response to the grouping command, and display the menu on the display 151 (S43). The tag classification menu may include tag classification items classified by classification standard. In a case the user uses any one of the proximity sensor 141, the touch sensor 142 and the user input unit 130 to select one of items from the tag classification menu, the selected tag classification item of the tag classification menu is displayed on the display 151.

FIG. 7 is a flowchart of a method for displaying items to which a proximity sensor is applied according to an exemplary embodiment of the present disclosure.

The proximity sensor 141 installed at the display 151 of the mobile terminal 100 detects the approach of a pointing device (e.g., a finger of a user, stylus or the like) (S51). The controller 180 determines whether the pointing device has approached within a predetermined distance (S52). If the pointing device has approached within a predetermined distance, the proximity sensor 141 generates a grouping command, and the controller 180 in turn generates a classification menu (e.g., a folder represented by an initial) and displays the classification menu on the display 151 in response to the grouping command (S53). The classification menu may include classification items classified by classification standard.

The controller 180 determines whether the pointing device has approached a second distance which is nearer than a first distance. Alternatively, the controller 180 determines whether the pointing device has touched one of the displayed classification menu (S54). In a case one of the menu displayed in the display 151 is selected, the selected classified item in the classification menu is displayed on the display 151 (S55), detailed exemplary embodiments of the method will be described later.

Furthermore, according to another exemplary embodiment of the present invention, the user may use a set-up menu of the mobile terminal 100 to automatically generate a classification menu of a menu such as a caller history or a phone book, and store the newly generated items classified into each classification menu.

To be more specific, a grouping set-up menu is generated and a grouping is set up from the grouping menu according to a plurality of items. In a case a command is received for displaying the plurality of items, the plurality of items is classified, and a classification menu including the classified items is generated and displayed.

Now, exemplary embodiments of the method for displaying items in the mobile terminal will be described with reference to FIGS. 8 to 10.

Figure 8:
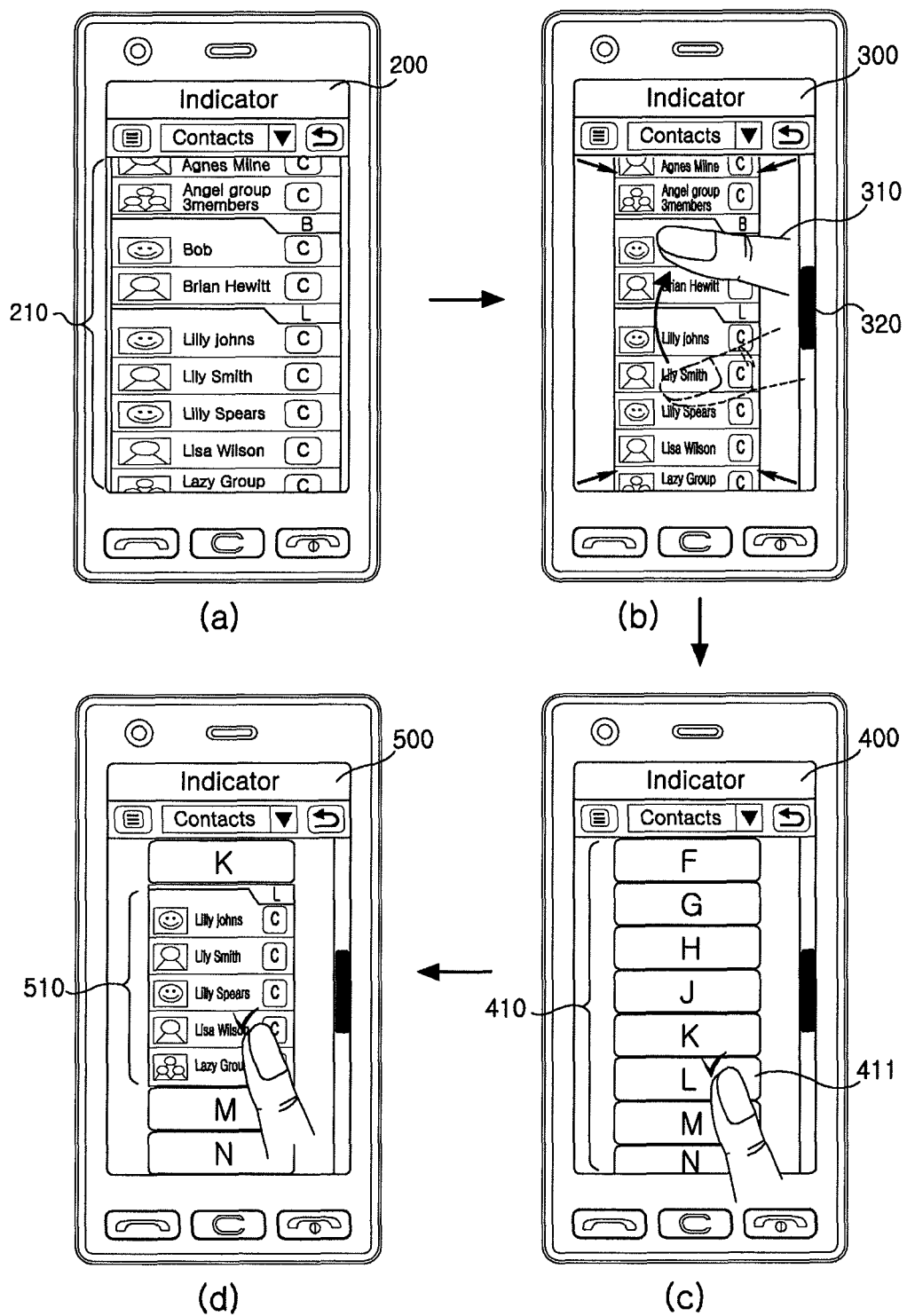
FIG. 8 is an image view of a method for displaying items according to a first exemplary embodiment of the present disclosure.
Figure 9:
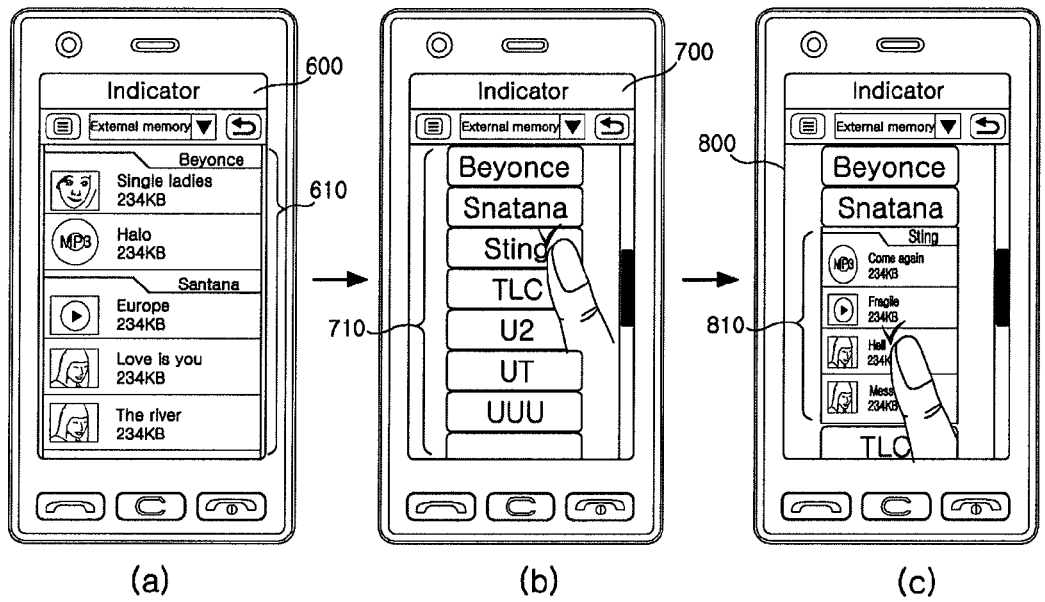
FIG. 9 is an image view of a method for displaying items according to a second exemplary embodiment of the present disclosure.
Figure 10:
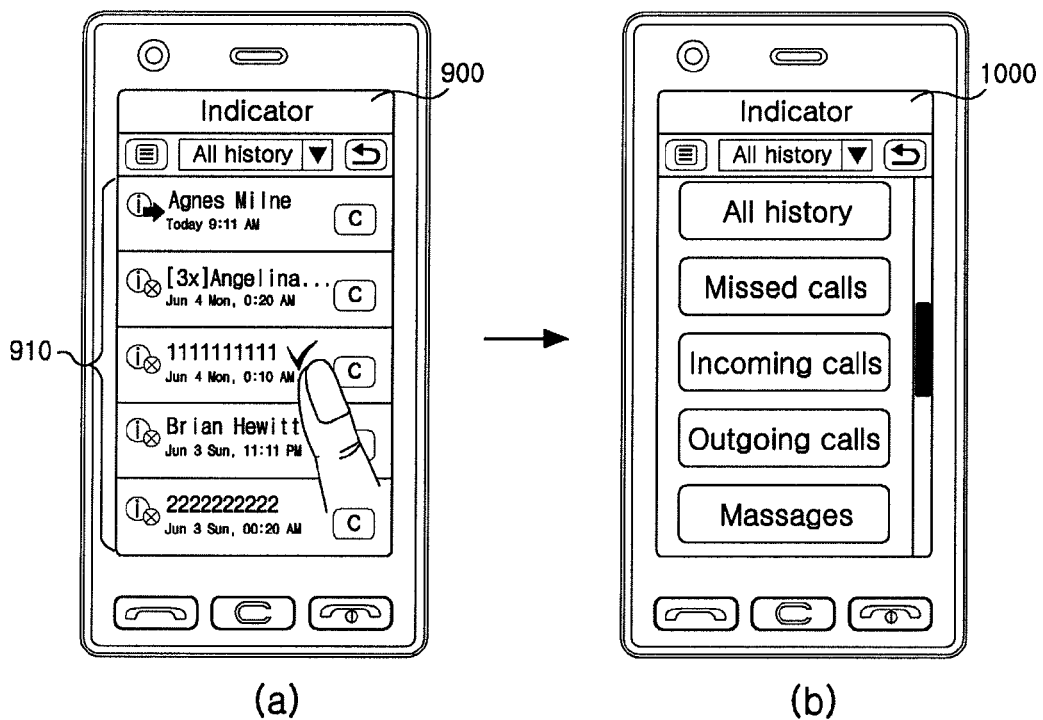
FIG. 10 is an image view of a method for displaying items according to a third exemplary embodiment of the present disclosure.

FIG. 8 is an image view of a method for displaying items according to a first exemplary embodiment of the present disclosure, FIG. 9 is an image view of a method for displaying items according to a second exemplary embodiment of the present disclosure, and FIG. 10 is an image view of a method for displaying items according to a third exemplary embodiment of the present disclosure.

Referring to FIG. 8(*a*), a phone book list screen 200 is displayed with a plurality of phone book items 210. The user generates a drag signal of one direction of a finger while the phone book list screen 200 is displayed with a plurality of phone book items 210 {see FIG. 8(*b*)}. A screen 300 for describing the generation of drag signal may be displayed with the plurality of phone book items in a zoom-out process and a scroll bar 320 may be generated on the display 151.

Referring to FIG. 8(*c*), a phone book classification menu screen 400 is displayed on the display 151 by the drag signal. The drag signal may be a drag signal that is repeated two or more times. Furthermore, the drag signal may replaced by a long key input to a side key mounted on a lateral surface of the mobile terminal 100, repeated several input of direction key or an approach signal from the proximity sensor 141.

A classification menu 410 may be generated based on the initial as illustrated in the figure or may be generated based on a group name designated by the user. A classification item 510 corresponding to the classification may be displayed in a case the user selects one classification menu using a finger. A screen displayed with the classified item is illustrated in FIG. 8(*d*). According to the above-mentioned exemplary embodiment, the user can easily find a desired caller from the phone book.

FIG. 9 is an image view of a method for displaying items according to a second exemplary embodiment of the present disclosure.

FIG. 9(*a*) illustrates multimedia file list screen such as a MP3 file, a music file, a stationary file and a moving picture.

The phone book list screen 200 is displayed with a plurality of multimedia files 610. In a case the user generates a drag signal of one direction using a finger while the plurality of multimedia files is displayed on the display 151 of the mobile terminal {see FIG. 9(*b*)}. Then, a classification menu (aka, a tag classification menu due to use of tag information) per artist 710 is generated and displayed on the display 151. At this time, a classification menu screen per artist 700 may be generated with a scroll bar 720. The drag signal may be a signal that is repeatedly dragged two or more times. A long key input to a side key mounted on a lateral surface of the mobile terminal 100, repeated several input of direction key or an approach signal from the proximity sensor 141 may generate the classification menu per artist 710.

Alternatively, the tag information may be used to generate a classification menu per composer, a classification menu per leading actor, or classification menu per multimedia type.

In a case the user selects a classification menu from the classification menu per artist 710 using a finger, a classified item 810 corresponding to the classification is displayed. A screen 800 displayed with the classified item is illustrated in FIG. 9(*c*). According to the above-mentioned exemplary embodiment, the user can rapidly find a desired multimedia file from the multimedia file folder.

FIG. 10 is an image view of a method for displaying items according to a third exemplary embodiment of the present disclosure.

FIG. 10(*a*) illustrates a call history screen 900. The call history screen 900 is displayed with a plurality of call items 910. The user generates an approach signal using a finger 310 while a plurality of call items 910 is displayed on the display 151 of the mobile terminal 100. The approach signal is generated by the proximity sensor 141 and is generated when the user finger is sensed within a predetermined distance.

Referring to FIG. 10(*b*), a call history classification menu screen 1000 is displayed on the display 151 by the approach signal. The call history classification menu screen 1000 may generate a call type classification menu based on the call type, or based on transmission/reception date of call. According to the above-mentioned exemplary embodiment, the user can rapidly find a desired call from the call history folder.

The above-mentioned method for displaying items in mobile terminal and mobile terminal using the method for displaying items may, however, be embodied in many different forms and should not be construed as limited to the embodiments set forth herein. While particular features or aspects may have been disclosed with respect to several embodiments, such features or aspects may be selectively combined with one or more other features and/or aspects of other embodiments as may be desired.

Although the present disclosure has been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for displaying items in a mobile terminal, the method comprising:
   storing a plurality of items in a memory of the mobile terminal;
   displaying at least one of the plurality of items on a display of the mobile terminal;
   detecting a proximity touch by the proximity sensor, the proximity sensor being configured to generate different commands based on a height of the detected proximity touch;
   receiving a grouping command inputted by the proximity touch on the at least one of the plurality of items displayed through the proximity sensor of the mobile terminal; and
   generating a classification menu by classifying the plurality of items by the grouping command and storing the classified plurality of items in the classification menu; and
   displaying the classification menu.

2. The method of claim 1, further comprising:
   detecting an input indicating a subset of classified items of the classified plurality of items in the classification menu; and
   displaying the subset of classified items.

3. The method of claim 2, wherein the input is a micro proximity signal.

4. The method of claim 3, further comprising executing a function of the mobile terminal related to one of the classified items of the subset of classified items in response to a touch signal selecting said one of the classified items.

5. The method of claim 2, wherein the input is a touch signal.

6. The method of claim 1, wherein each of the plurality of items is a call history item, and the grouping command is a classification command based on an initial of a caller associated with each call history item.

7. The method of claim 1, wherein each of the plurality of items is a multimedia file, and the grouping command is a classification command based on tag information associated with each of the multimedia files.

8. The method of claim 1, wherein each of the plurality of items is a text message item, and the grouping command is a classification command based on date information associated with each of the text message items.

9. The method of claim 1, wherein the step of receiving a grouping command includes:
- measuring a distance of a pointing device from the display displayed with at least one of the plurality of items; and
- generating the grouping command when the measured distance is shorter than a predetermined distance.

10. A mobile terminal comprising:
- a memory configured to store a plurality of items;
- a display configured to display the plurality of items;
- a proximity sensor configured to generate different proximity touch signals based on detected heights of a proximity touch, at least one of the proximity touch signals being a grouping command; and
- a controller configured to generate a classification menu by classifying the plurality of items by the grouping command and to display the classification menu on the display.

11. The mobile terminal of claim 10, wherein the controller is configured to display on the display a subset of classified items of the classified plurality of items in the classification menu when a selection signal is generated by the classification menu.

12. The mobile terminal of claim 11, wherein the selection signal is a micro proximity signal generated by the proximity sensor.

13. The mobile terminal of claim 12, wherein the display is a touch screen, and the controller is configured to execute a function of the mobile terminal related to one of the classified items of the subset of classified items in response to a touch signal generated by the touch screen selecting said one of the classified items.

14. The mobile terminal of claim 12, wherein the proximity sensor generates the micro proximity signal when a distance between the proximity sensor and a pointing device is shorter than a predetermined micro proximity distance.

15. The mobile terminal of claim 11, wherein the display is a touch screen, and the controller is configured to execute a function of the mobile terminal related to one of the classified items of the subset of classified items in response to a touch signal generated by the touch screen selecting said one of the classified items.

16. The mobile terminal of claim 10, wherein each of the plurality of items is a call history item, and the grouping command is a classification command based on an initial of a caller associated with each call history item.

17. The mobile terminal of claim 10, wherein each of the plurality of items is a multimedia file, and the grouping command is a classification command based on tag information associated with each of the multimedia files.

18. The mobile terminal of claim 10, wherein each of the plurality of items is a text message item, and the grouping command is a classification command based on date information associated with each of the text message items.

19. The mobile terminal of claim 10, wherein the proximity sensor generates the proximity touch signal when a distance between the proximity sensor and a pointing device is shorter than a predetermined proximity distance.

* * * * *